(12) United States Patent　(10) Patent No.:　　US 6,515,782 B1
Harrigan et al.　　　　　　　　(45) Date of Patent:　　　Feb. 4, 2003

(54) TELECENTRIC F-THETA LENS FOR LASER MICROFILM PRINTER

(75) Inventors: Michael E. Harrigan, Victor, NY (US); David Kessler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/066,934

(22) Filed: Feb. 4, 2002

(51) Int. Cl.[7] .............................. G02B 26/08; G02B 9/00
(52) U.S. Cl. ...................... 359/206; 359/216; 359/662
(58) Field of Search ........................... 359/205–219, 359/662, 663, 710, 713, 714, 754, 755, 757, 764

(56) References Cited

U.S. PATENT DOCUMENTS

| | | |
|---|---|---|
| 4,863,250 A | 9/1989 | Ishizuka |
| 4,880,299 A | 11/1989 | Hamada |
| 5,087,987 A | 2/1992 | Simbal |
| 5,247,385 A | 9/1993 | Takanashi |
| 5,381,259 A * | 1/1995 | Appel .......................... 359/216 |
| 5,404,247 A | 4/1995 | Cobb et al. |
| 5,793,515 A * | 8/1998 | Sekikawa ................... 359/216 |
| 5,867,298 A | 2/1999 | Harrigan et al. |

* cited by examiner

*Primary Examiner*—James Phan
(74) *Attorney, Agent, or Firm*—Nelson Adrian Blish

(57) ABSTRACT

A laser microfilm printer (170) having a telecentric F-theta scan lens (166) with optical resolution for image pixel sizes 1–5 microns for writing on an image-receiving medium (164) comprises a polygon reflector. A laser beam incident on the polygon reflector, has a diameter as measured at the $1/e^2$ intensity value, which is at least 1.4 times a width of a polygon facet (162) in a scan section of the laser microfilm printer (170). The polygon facet (162), at center of scan position, is in a substantially optically conjugate relationship with the image-receiving medium (164) in a cross-scan section of the laser beam (160). The cross-scan section of the F-theta lens (166) has an absolute value of optical magnification of 0.25 to 0.5 as measured from the facet (168) to the image-receiving medium (164).

6 Claims, 8 Drawing Sheets

TELECENTRIC F-THETA LENS FOR LASER MICROFILM PRINTER

FIELD OF THE INVENTION

This invention relates in general to telecentric laser printers for microfilm and in particular to high spot density telecentric laser printers using overfilled polygon scanners.

BACKGROUND OF THE INVENTION

Most laser printers using polygonal mirrors as the scanner for the laser beam use under-filled designs. This means that the laser beams are smaller than each mirror facet of the polygon rotating through the beam incident on it. As the requirements for very high pixel densities at the film increase to very high values such as 8000 dots per inch or more, these polygons necessarily become larger is size. Large diameter polygons are more expensive to manufacture with high quality facets and the increased weights place heavier demands on the motor drives.

Polygon scanners rotate across the incident beam causing, in effect, a variation of the entrance pupil of the F-theta scan lens focusing the beam onto the film because the reflection point of the beam moves. Larger diameter polygons produce proportionally more motion of the effective entrance pupil for the scan lens. This leads to a larger polygon induced field curvature different in both the scan section of the beam (the section of the beam parallel to the scan line) and in the cross-scan section of the beam (the section of the beam perpendicular to the scan line). These polygon induced field curvatures must be compensated to a very high degree by the field curvatures of the F-theta scan optics in order to keep the pixel forming spot in the same focal plane as it scans across the film. This problem is compounded in very high pixel density systems due to the inherently shallow depth of focus of a very small pixel. Therefore achieving high pixel densities with polygon scanners places heavy demands on the F-theta lens leading to complex designs.

Examples of the complexities of computer output microfilm (COM) F-theta lenses are given in U.S. Pat. No. 4,880,299, none of which have fewer than six rotationally symmetric elements in addition to anamorphic optics to compensate for polygon wobble and facet pyramid error. The requirement of telecentricity in such laser scanners adds to the complexity and size since the diameter of these lenses cannot be less that the total length scanned on the film.

In addition, while microfilm F-theta systems do not typically require color correction across the complete visible spectrum, they do need to have a certain correction for small variations in laser wavelength from laser to laser, or for mode hops as disclosed by Takanashi in U.S. Pat. No. 5,247,385. Some laser printers are designed for multiple mode lasers as disclosed by Isizuka in U.S. Pat. No. 4,863,250, but this is also a broader spectrum than for single mode laser as disclosed in this invention. Some other broad spectral range corrected telecentric F-theta lenses are disclosed by Cobb in U.S. Pat. No. 5,404,247 and Simbal in U.S. Pat. No. 5,087,987.

SUMMARY OF THE INVENTION

Objects of this invention are to reduce the polygon induced field curvature through the use of an overfilled polygon, to provide well balanced field curvatures across a 33 mm scan length for pixel densities over 7900 dots per inch, specific chromatic correction over a narrow wavelength range about 685 nanometers, and a well corrected cross-scan optical system for polygon pyramid error.

Briefly according to one aspect of the present invention a laser microfilm printer having a telecentric F-theta scan lens with optical resolution for image pixel sizes 1–5 microns for writing on an image-receiving medium comprises a polygon reflector. A laser beam incident on the polygon reflector, has a diameter as measured at the $1/e^2$ intensity value, which is at least 1.4 times a width of a polygon facet in a scan section of the laser microfilm printer. The polygon facet, at center of scan position, is in a substantially optically conjugate relationship with the image-receiving medium in a cross-scan section of the laser beam. The cross-scan section of the F-theta lens has an absolute value of optical magnification of 0.25 to 0.5 as measured from the facet to the image-receiving medium.

The subject of this invention differs from laser computer output microfilm (COM) printers in that COM printers expose in a bi-tonal fashion whereas this invention is a multilevel gray scale exposure printer.

The invention and its objects and advantages will become more apparent in the detailed description of the preferred embodiment presented below.

DETAILED DESCRIPTION OF THE INVENTION

Figure 1:
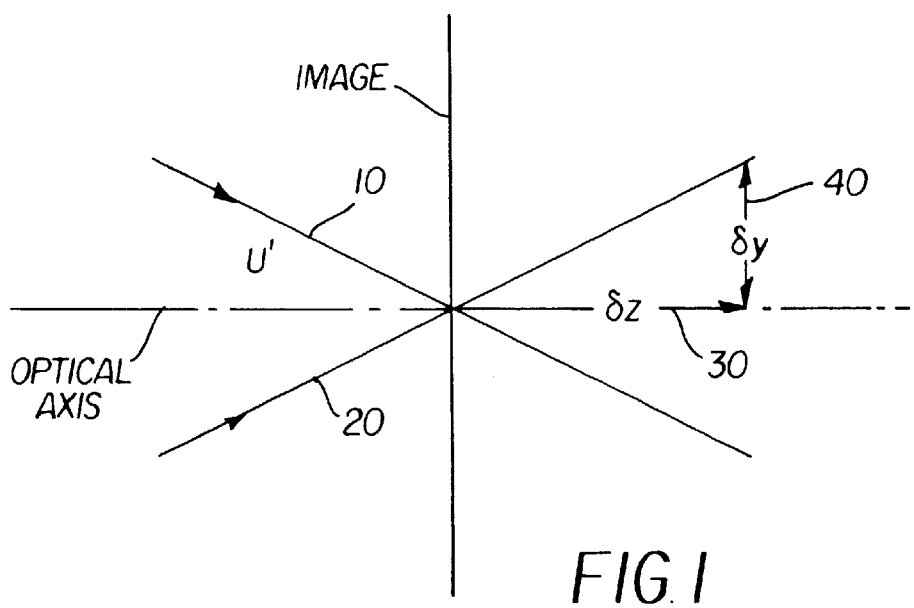
FIG. 1 illustrates two rays focusing on an image plane and the lateral focus error when the focus is shifted.

There are a number of considerations in the design of polygon scanners and the many design parameters are constrained in complex ways. One important design choice is the physical size or diameter of the polygon itself. Generally the smallest size polygon is desired for reduced manufacturing cost. Also, the polygon itself induces field curvature, the focal errors of the focused spot on the image-receiving medium, as the polygon rotates through a facet. These focal errors, as will be shown below, are smaller when the polygon radius is smaller. U.S. Pat. No. 5,867,298 (Harrigan) shows that there is a minimum size polygon requirement when a number of scan characteristics are pre-determined:

$$D_p = \frac{\beta \lambda SN}{2\omega_0 \pi^2 \varepsilon} \frac{1}{\cos\left(\frac{\theta_i}{2}\right) \sin\left(\frac{\pi}{N}(1-\varepsilon)\right)} \quad \text{Equation 1}$$

$D_p$=diameter of the polygon measured across the corners (the diameter of a circle circumscribing the polygon)

S=total length of the scan line $\lambda$=wavelength of light $\varepsilon$=duty cycle (the fraction of the angle subtended by the polygon facet during which the active scan takes place)

N=the total number of facets on the polygon $\omega_0$=radius of the beam waist (at the $1/e^2$ intensity level) located at the image $\beta$=truncation factor by the polygon at the end of scan as it rotates through the incident beam (a value of 1 means the corner of the facet clips the incident beam at its $1/e^2$ intensity level)

$\theta_i$=total angle between the incident beam and the deflected beam at the center of scan The dependence of the polygon diameter of both the number of facets and the duty cycle are particularly strong. This can be seen more easily for the case of N large enough to allow the sine function in the denominator to be replaced by its argument. In this case the minimum polygon radius is proportional to the number of facets squared and inversely proportional to the product $\varepsilon(1-\varepsilon)$.

Less clipping by the polygon means that the beam diameter is smaller with respect to the a polygon facet and this is reflected in the $\beta$ factor which is defined as the fraction of the $1/e^2$ beam radius at which the polygon intercepts the beam at end of scan. A $\beta$ value of 2 means that a corner of the polygon intercepts the incident Gaussian beam at twice the beam's $1/e^2$ intensity level. For underfilled polygon scanners, the $\beta$ factor normally has a value near unity. If one allows the polygon to heavily clip the incident beam even at the center of scan this is referred to as an overfilled polygon scanner. It is not unusual to have the beam clipped within the $1/e^2$ intensity level in an overfilled polygon scanner. The limiting case of heavy clipping is where the facet becomes nearly uniformly illuminated and then the facet size itself along with the F-theta focal length defines the smallest focused spot that can be obtained. In underfilled polygon scanners, the beam size itself defines the smallest spot that can be obtained rather than the facet.

An advantage of overfilled polygon scanners is that the polygon diameter can be much smaller and a factor of two smaller is not unusual. Overfilled scanners are normally used when a large number of facets is desired in order to have a high rate of line scans per second since each facet scans a single line. As can be seen by Equation 1 above, the polygon diameter is approximately proportional to the number of facets squared, so it becomes impractical to use an underfilled polygon with a high number of facets. The disadvantages of overfilled polygons are: loss of exposure power due to the heavy clipping of the beam by the polygon, generally larger variation of pixel size due to clipping variation across the scan, and variation of the exposure power across the scan line due to variable clipping versus scan.

All polygon scanners induce field curvature across the scan because the facet moves in and out with respect to the scan lens. In a high resolution printer, the spot is very small and consequently diverges rapidly causing limited focal depth. For example, the Rayleigh distance $Z_R$, defined as the focal error at which the spot grows 41%, is given by:

$$Z_R = \frac{\pi \omega_0^2}{\lambda}$$

This shows that the Rayleigh distance or depth is proportional to the waist radius $\omega_0$ and inversely proportional to the wavelength $\lambda$. The fact that the spot radius is squared compounds the depth problem because it reduces much more quickly than if it were just proportional. With a radius of 3 microns and wavelength 0.685 microns for example, the Rayleigh depth is just 41 microns.

There are two separate cross-scan field curvatures of concern. First, to compensate for polygon pyramid errors in which the facets may not form a perfect vertical cylinder, it is common practice for the F-theta optics to geometrically image the polygon facet onto the film or image-receiving medium in the cross-scan section of the optical system. Because the facet moves in and out as the polygon rotates, this conjugate relation between the facet and the medium cannot be maintained exactly for every scan angle. This conjugate failure causes the scan lines to be misplaced from their ideal position. This error is normally very small, but because it is periodic, repeating with each polygon rotation, it can create a low frequency banding to which the eye is very sensitive. The optical system, in the cross-scan section, will contribute its own cross-scan field curvature and it is desirable to have it this contribute an opposite amount to the polygon induced field curvature in order to reduce the total residual defocus of the facet at the medium.

The second cross-scan field curvature is partly caused by the pyramid correction optics described above. It is desirable to have the laser beam Gaussian waists located on the image-receiving medium to provide maximum depth of focus. If one computes the incident beam requirements to have the cross-scan beam waist at the medium, it is found that there should be a waist of the incident beam in the cross-scan section in the vicinity of the polygon facet when pyramid correcting optics are used. The image of this waist after reflection from the polygon then will be focused on the medium by the cross-scan section of the F-theta. As the polygon rotates, however, this waist image moves out of focus on the medium too. It is important to keep both of these cross-scan field curvatures under tight control, especially in a high resolution microfilm printer with very limited depth.

These polygon induced field curvatures can be computed theoretically. As the polygon rotates by an amount ½φ from the center of scan position, the incident beam will be intercepted at a distance W, as measured along the beam, from the intercepted position at the center of scan facet. The projection of W along the optical axis of the scan lens is the object distance as seen by the F-theta for purposes of pyramid correction or imaging the facet. Therefore W cos ($2\theta_i$) is the polygon induced object distance variation as the facet rotates because W depends on φ as follows:

$$W = \frac{R(1 - \cos\phi) - h\sin\frac{1}{2}\phi}{\cos\left(\theta_i + \frac{1}{2}\phi\right)} \quad \text{Equation 2}$$

In this Equation h is the height, measured along the facet, above the center of the facet at which the beam intercepts the facet at center of scan. This parameter h affects the clipping at each end of scan and it can be chosen to equalize this if desired. This value is proportional to the radius R, but in any case is a small fraction of the facet width. This field curvature is nearly proportional to the polygon radius, so the polygon size is a very significant contributor to field curvature.

As described above, the incident beam will have a waist in the cross-scan section in the vicinity of the facet when pyramid correcting optics are used. Let the distance from the facet to the input beam waist, as measured along the incident beam be $d_p$. Then let the change in the waist position with scan after reflection from the facet be $\Delta z$:

$$\Delta z = W \cos(2\theta_i) + (d_p + W)\cos\psi - d_p \quad \text{Equation 3}$$

This is the polygon induced waist field curvature on the polygon side of the F-theta. It can be seen that the pyramid induced field curvature, $W \cos(2\theta_i)$, contributes to the waist induced field curvature.

The affect of each of these polygon induced field curvatures on the image side of the F-theta can be computed as follows. Given a magnification $m_p$ of the cross-scan pyramid optics from the facet to the medium, each of these field curvatures is multiplied by $m_p$ squared to get the field curvature on the exposed medium or image side of the F-theta. It would seem that the polygon induced field curvatures, or the image side field curvatures could be reduced to any acceptable level by simply making the magnification $m_p$ as small as necessary, especially since its effect is proportional it the square of its value. However, the maximum available depth of focus is reduced as the magnification, $m_p$ becomes smaller. This can be seen from the following considerations and FIG. 1 showing two rays 10 and 20, focusing at the image.

Each ray is the central ray of a bundle reflected from facets with physical pyramid error $\pm u_0$. As the focus is shifted by $\delta z$ 30, each of central rays will have a lateral error of $\delta y$ 40. The central rays will expose the center of each raster line as it scans across the page, so the raster lines will have their spacing increased by $\delta y$. This error will repeat with each rotation of the polygon and will cause a banding in the image. A tolerance on the maximum permissible $\delta y$ can be specified in order to keep the banding within visible limits. So $\delta y$ can be regarded as a given as can the maximum pyramid errors allowed by the polygon manufacturer. If u' is known, then the maximum focus shift $\delta z$ can be determined. After reflection from the polygon, these rays have angles $\pm 2u_0$ with respect to the optical axis as they enter the F-theta lens. They converge on the image at angles $\pm u'$ because of the pyramid correcting optics which makes the facet geometrically conjugate to the image. Since the magnification between the facet and image is $m_p$, u' is related to $2u_0$ by:

$$u' = \frac{2u_o}{m_p}$$

As can be seen, with $u_0$ and $m_p$ given, the final convergence angle u' would be known. So the maximum permissible depth of focus $\delta z$ is determined by:

$$\delta z = \frac{\delta y}{u'} = m_p \frac{\delta y}{2u_0}$$

The achievable depth of focus must be less than this because the cross-scan field curve subtracts from this. As can be seen from the above result, the maximum theoretical depth, $\delta z$, is proportional to the magnification $m_p$ so reducing the magnification, while being an advantage for reducing the polygon induced cross-scan field curvature, is a disadvantage since it reduces $\delta z$. The magnification must be carefully selected to balance these two conflicting requirements in order to achieve the largest realizable cross-scan depth of focus.

But in any case, it can be seen that if the polygon radius can be made smaller, the induced field curvature will be smaller, making the optics less constrained to compensate for it. This is the benefit of using an overfilled polygon scan design in which the polygon radius can be much smaller.

Figure 2:
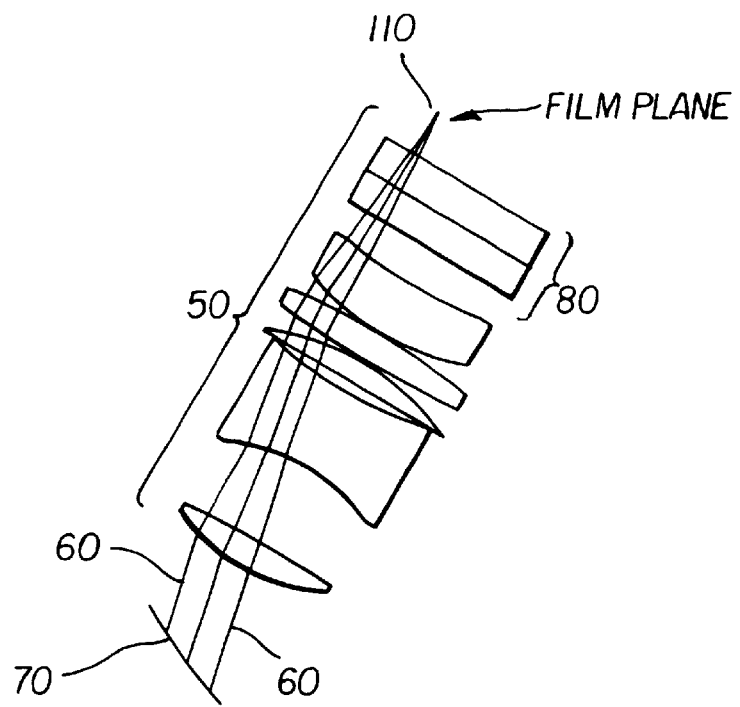
FIG. 2 is a scan section of F-theta lens of the preferred embodiment with three rays at the end of scan.
Figure 3:
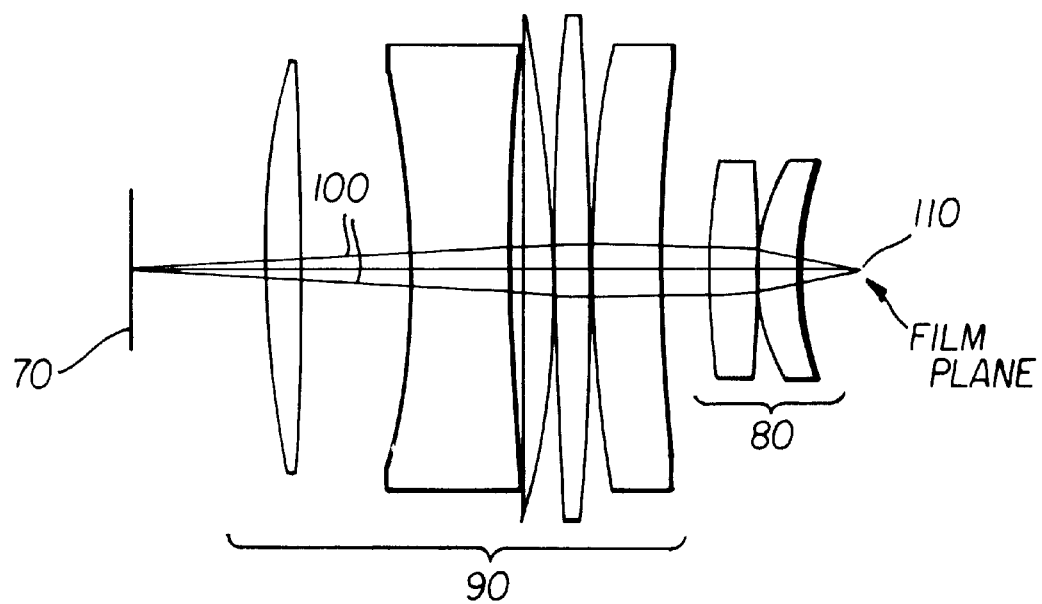
FIG. 3 is a cross-scan section of the F-theta lens of the preferred embodiment with three rays at the center of scan.

FIGS. 2 and 3 illustrate the preferred embodiment of the F-theta lens of this invention. FIG. 2 shows a scan section of the lens 50 along with rays 60, defining the $1/e^2$ beam limits after reflection from a polygon facet 70 at one end of scan. FIG. 3 shows a cross-scan section of the lens with rays 100 defining the $1/e^2$ beam limits after reflection from a polygon facet 70 at the center of scan. The design consists of five spherical elements 90 of positive, negative, and three positive elements in order from the polygon. The five spherical elements are followed by two cylindrical elements 80 to focus the rays emanating from the polygon facet 70 which are collimated by the spherical elements 90 as can be seen in FIG. 3. This type of design has the polygon facet 70 at the front focal point of the spherical lens group 90 so that the marginal rays 100 in FIG. 3 exit parallel to the optical axis and are then focused by the cylindrical lenses 80 onto the image-receiving medium 110. Aside from aberrations introduced as these bundles are scanned through the spherical lens group 90 the rays pass through the cylindrical lenses 80 in nearly identical fashion, but shifted along the axis cylinders which is parallel to the line being scanned. The aberration introduced this way will tend to cancel the polygon induced cross-scan field curvatures and result in a flatter field at the image plane. The requirement on the spherical lens group to cancel the polygon induced cross-scan field curvature places an additional constraint on this optical group.

Figure 4:
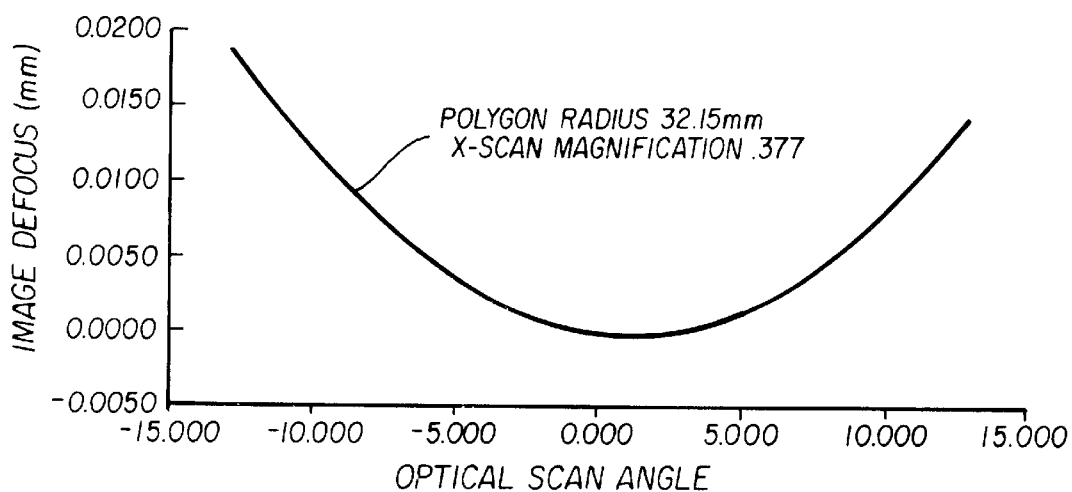
FIG. 4 is a graph of the polygon induced focal curve of the cross-scan section of the preferred embodiment.
Figure 5:
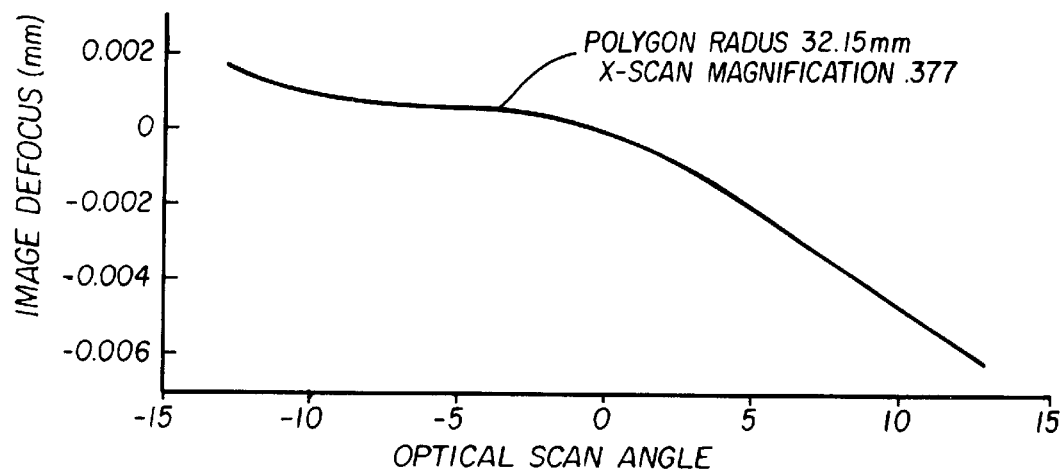
FIG. 5 is a graph of the total cross-scan focal curve of the preferred embodiment.

Table 1 gives a list of the lens design parameters of Embodiment 1, the preferred embodiment. This F-theta lens is designed to work with a 14 facet polygon of inscribed circle radius 32.15 mm with an overfilled beam. The $1/e^2$ incident beam diameter on the 14.6761 mm facet width polygon is 23.7712, sufficient to give a $1/e^2$ diameter of 0.006 mm on the image. This overfill ratio will cause a power loss of about 30% at center of scan and 40% at end of scan. The preferred embodiment has magnification between facet and image of 0.377 in the cross-scan section. With this magnification, the facet motion for this design will cause a field curve at the image as shown in FIG. 4. The lens elements introduce a compensating field curvature of −0.016 mm at −12.86 degrees scan, so the residual is 0.0025 mm of focal error on the image side. At the other end of scan the lens elements contribute −0.0217 mm to leave a focal error of −0.0055 mm providing an extraordinarily flat facet image field over the 33 mm total scan as shown if FIG. 5.

TABLE 1

Embodiment 1

| | Radius Polygon facet | Space 30.000 | Glass |
|---|---|---|---|
| 1 | 49.855 | 8.000 | FK5 |
| 2 | −242.336 | 24.428 | |
| 3 | −49.706 | 25.000 | TIH53 |
| 4 | 139.292 | 2.209 | |
| 5 | −24454.000 | 7.000 | LAM2 |
| 6 | −61.758 | 0.100 | |
| 7 | 197.484 | 8.000 | LAH63 |
| 8 | −196.128 | 0.100 | |
| 9 | 66.162 | 14.880 | LAM52 |
| 10 | 111.656 | 8.636 | |
| 11 | 38.936* | 10.000 | SF11 |
| 12 | −1465.385* | 0.099 | |
| 13 | 14.3739* | 10.000 | BK7 |
| 14 | 13.886* | 15.124 | |

*Cross-scan cylinder

The preferred embodiment has a theoretical polygon induced waist focal error according to Equation 3, multiplied by 0.377 squared of 56 and 43 microns at −12.86 and 12.86 degrees of optical scan respectively. These are compensated by the lens elements in the same amounts above to leave 38 and 22 microns respectively at the ends of scan. These focal errors cause the cross-scan spot $1/e^2$ diameters to grow by 36% and 13% respectively. In use, it is possible to arrange the input waist of the beam incident on the polygon to be placed so that the waist at the image located in the midpoint between the extreme focus positions. If this is done, maximum waist focal error would be ±19 microns, causing a waist size variation of less than ±10 percent across the whole 33 mm scan.

Figure 6:
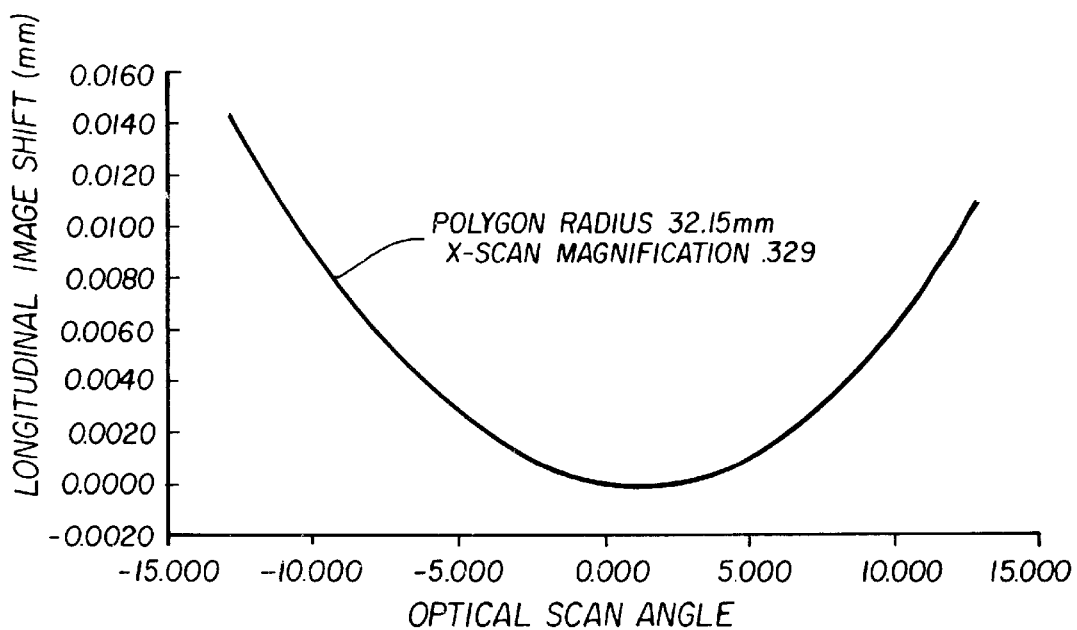
FIG. 6 is a graph of the polygon induced focal curve of the cross-scan section of the second embodiment.
Figure 7:
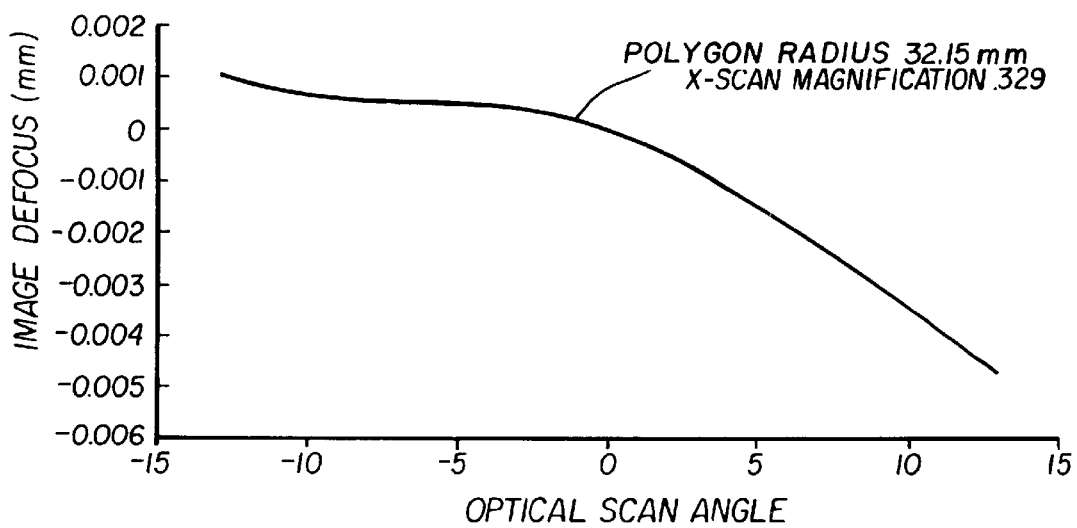
FIG. 7 is a graph of the total cross-scan focal curve of the second embodiment.

Embodiment 2 lens design data is shown in Table 2. With a magnification between facet and image of 0.329 in the cross-scan section, the facet motion for this design will induce a focal curve at the image as shown in FIG. 6. As can be seen in FIG. 6, the smaller magnification reduces the polygon induced focal error. This embodiment of the F-theta lens introduces a compensating field curvature of −0.0125 mm at −12.86 degrees scan, so the residual is only 0.0012 mm of focal error. At the other end of scan the lens contributes −0.0151 mm to leave a focal error of −0.0048 mm providing a very flat field over the 33 mm total scan as shown if FIG. 7.

TABLE 2

Embodiment 2

| | Radius Polygon facet | Space 30.000 | Glass |
|---|---|---|---|
| 1 | 49.639 | 8.000 | FK5 |
| 2 | −244.251 | 24.691 | |
| 3 | −49.154 | 22.858 | TIH53 |
| 4 | 138.656 | 2.308 | |
| 5 | −43114.290 | 7.000 | LAM2 |
| 6 | −61.202 | 0.100 | |
| 7 | 248.445 | 8.000 | LAH63 |
| 8 | −179.621 | 0.100 | |
| 9 | 68.098 | 15.759 | LAM52 |
| 10 | 131.946 | 10.281 | |
| 11 | 41.502* | 10.000 | SF11 |
| 12 | −426.623* | 0.099 | |

TABLE 2-continued

Embodiment 2

| | Radius Polygon facet | Space 30.000 | Glass |
|---|---|---|---|
| 13 | 14.202* | 10.000 | BK7 |
| 14 | 18.893* | 13.167 | |

*Cross-scan cylinder

Embodiment 2 has a theoretical polygon induced waist focal error according to Equation 3, multiplied by 0.329 squared of 43 and 33 microns at −12.86 and 12.86 degrees of optical scan respectively. These are compensated by the lens elements in the same amounts above to leave 29 and 16 microns respectively at the ends of scan. These focal errors cause the cross-scan spot $1/e^2$ diameters to grow by 22% and 7% respectively. As in the preferred embodiment, it is possible to arrange input waist of the beam incident on the polygon to be positioned so that the waist at the image is located in the midpoint between the extreme focus positions. If this is done, the maximum waist focal error would be ±15 microns, causing a waist size variation of less than ±6 percent across the whole 33 mm scan.

Embodiment 3 lens design data is shown in Table 3. With a magnification between facet and image of 0.3, the facet motion for this design will induce focal errors at the image of 12 microns and 9 microns respectively at optical scan angles of −12.86 and 12.86 degrees. These values are reduced over those of the first two embodiment due to the lower magnification of 0.3. This embodiment of the F-theta lens introduces a compensating field curvature of −12 microns at −12.86 degrees scan and −13 microns at 12.86 degrees scan to leaves total values of the focal errors of 0 and −4 microns respectively.

Embodiment 3 has a theoretical polygon induced waist focal error according to Equation 3, multiplied by 0.3 squared of 36 and 27 microns at −12.86 and 12.86 degrees of optical scan respectively. These are compensated by the lens elements in the same amounts above to leave 23 and 14 microns respectively at the ends of scan. These focal errors cause the cross-scan spot $1/e^2$ diameters to grow by 15% and 6% respectively. As in the preferred embodiment, it is possible to arrange the input waist of the beam incident on the polygon to be placed so that the waist at the image is located in the midpoint between the extreme focus positions. If this is done, the maximum waist focal error would be ±12 microns, causing a waist size variation of less than ±4 percent across the whole 33 mm scan.

TABLE 3

Embodiment 3

| | Radius Polygon facet | Space 30.000 | Glass |
|---|---|---|---|
| 1 | 49.443 | 8.000 | FK5 |
| 2 | −236.965 | 25.145 | |
| 3 | −48.440 | 23.042 | TIH53 |
| 4 | 138.459 | 2.263 | |
| 5 | 19200.000 | 7.000 | LAM2 |
| 6 | −61.310 | 0.100 | |
| 7 | 268.017 | 8.000 | LAH63 |
| 8 | −172.719 | 0.100 | |
| 9 | 67.930 | 16.299 | LAM52 |
| 10 | 137.941 | 10.558 | |
| 11 | 42.224* | 10.000 | SF11 |
| 12 | −396.943* | 0.099 | |

TABLE 3-continued

Embodiment 3

| | Radius Polygon facet | Space 30.000 | Glass |
|---|---|---|---|
| 13 | 14.028* | 10.000 | BK7 |
| 14 | 24.644* | 12.009 | |

*Cross-scan cylinder

Embodiment 4 lens design data is shown in Table 4. With a magnification between facet and image of 0.41, the facet motion for this design will induce focal errors at the image of 22 microns and 17 microns respectively at optical scan angles of −12.86 and 12.86 degrees. These values are increased over those of the first three embodiments due to the higher magnification of 0.41. This embodiment of the F-theta lens introduces a compensating field curvature of −20 microns at −12.86 and −25 microns at 12.86 degrees scan to leaves total values of 2 and −8 microns respectively.

Embodiment 4 has a theoretical polygon induced waist focal error according to Equation 3, multiplied by 0.41 squared of 67 and 51 microns at −12.86 and 12.86 degrees of optical scan respectively. These are compensated by the lens elements in the same amounts above to leave 45 and 25 microns respectively at the ends of the scan. These focal errors cause the cross-scan spot $1/e^2$ diameters to grow by 48% and 17% respectively. As in the preferred embodiment, it is possible to arrange the input of the beam incident on the polygon to be placed so that the waist at the image is located in the midpoint between the extreme focus positions. If this is done, the maximum waist focal error would be ±23 microns, causing a waist size variation of less than ±15 percent across the whole 33 mm scan.

TABLE 4

Embodiment 4

| | Radius Polygon facet | Space 30.000 | Glass |
|---|---|---|---|
| 1 | 49.304 | 8.000 | FK5 |
| 2 | −248.487 | 25.428 | |
| 3 | −48.487 | 25.000 | TIH53 |
| 4 | 141.000 | 2.443 | |
| 5 | −1527.300 | 7.000 | LAM2 |
| 6 | −58.944 | 0.100 | |
| 7 | 138.756 | 8.000 | LAH63 |
| 8 | −284.458 | 0.100 | |
| 9 | 67.656 | 17.646 | LAM52 |
| 10 | 103.473 | 4.174 | |
| 11 | 35.405* | 10.000 | SF11 |
| 12 | 288.762* | 0.099 | |
| 13 | 14.285* | 10.000 | BK7 |
| 14 | 12.566* | 16.291 | |

All the embodiments of this invention have the same optical power structure in the following order from the polygon to the image; positive optical power, strong negative optical power, followed by three positive optical power elements and then two cross-scan cylindrical elements of positive optical power. The magnifications of the cross-scan optical system from the polygon facet to image all lie in the range of 0.3 to 0.41 for the following reasons. At the low end of the magnification, Embodiment 3 has the flattest cross-scan waist field curve and pyramid focal curve, but with the least available maximum focal depth it has less realized pyramid focal depth after subtracting the total focal curve.

Embodiment 3 also has, the shortest back focus or image working distance of 12 mm. At the high end of the magnification, Embodiment 4 has not only the maximum available focal depth, but the largest realized pyramid depth due to a larger amount of optical element compensating contribution. Embodiment 4 is limited by the large waist focal curve causing the largest cross-scan spot growth across the scan. Embodiment 4 also has the largest back focus of 16.3 mm. The preferred embodiment is a best compromise of field curvatures and back focus working distance.

It is important for laser printer F-theta lenses to perform equally well over at least a narrow wavelength range because laser wavelengths, while individually very narrow in their spectrum, cannot be exactly controlled in manufacture. For an F-theta lens the chromatic aberrations are focus shift with wavelength change and the equivalent of lateral color. The chromatic focus shift can affect the scan and cross-scan sections of the beam quite differently due to the anamorphic characteristic of these lenses. The equivalent of lateral color for a laser printer is the change of spot position with wavelength for a given scan angle. A comparable measure of lateral color in a laser printer is the change of F-theta error with wavelength. Both of these aberrations can be dealt with in a conventional manor by using an appropriate set of high and low dispersion glasses. However, this can lead to additional complexity such as more lens elements. The chromatic focus shifts can often be accommodated by a corresponding focus shift when the optical system is assembled. This would be the case if the aberration curves at the selected wavelengths differ only by a focus shift and do not have spherochromatism which is the change of spherical aberration with wavelength. The lateral chromatic can often be overcome by a small adjustment of the duty cycle to ensure that the desired scan length is achieved. This is the case when the chromatic aberration curves for non-zero scan angles differ from themselves only by a small shift in the scan position at the image.

Figure 8:
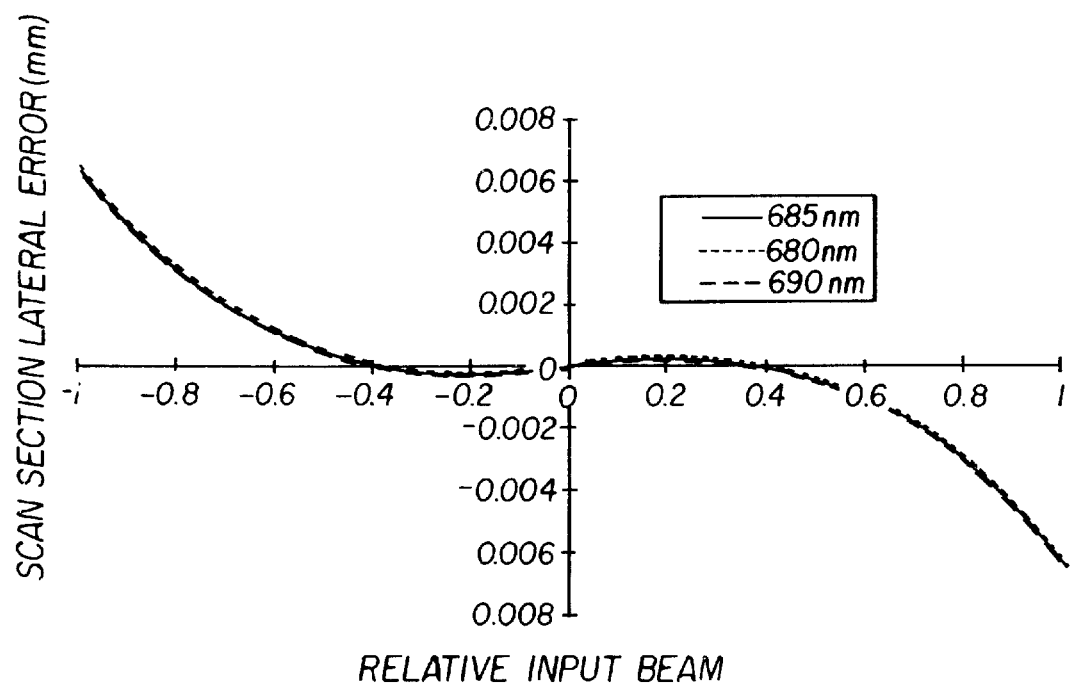
FIG. 8 is a graph of the lateral aberration curves of the scan section of the preferred embodiment at three nearby wavelengths at the center of scan.
Figure 9:
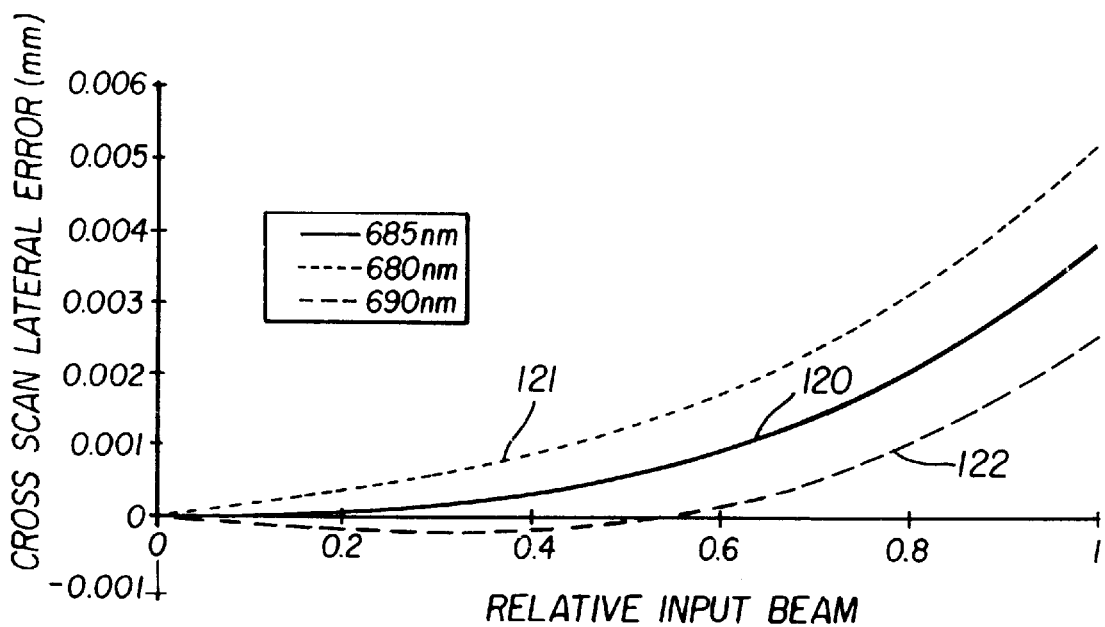
FIG. 9 are lateral aberration curves of the cross-scan section of the preferred embodiment at three nearby wavelengths at the center of scan.
Figure 10:
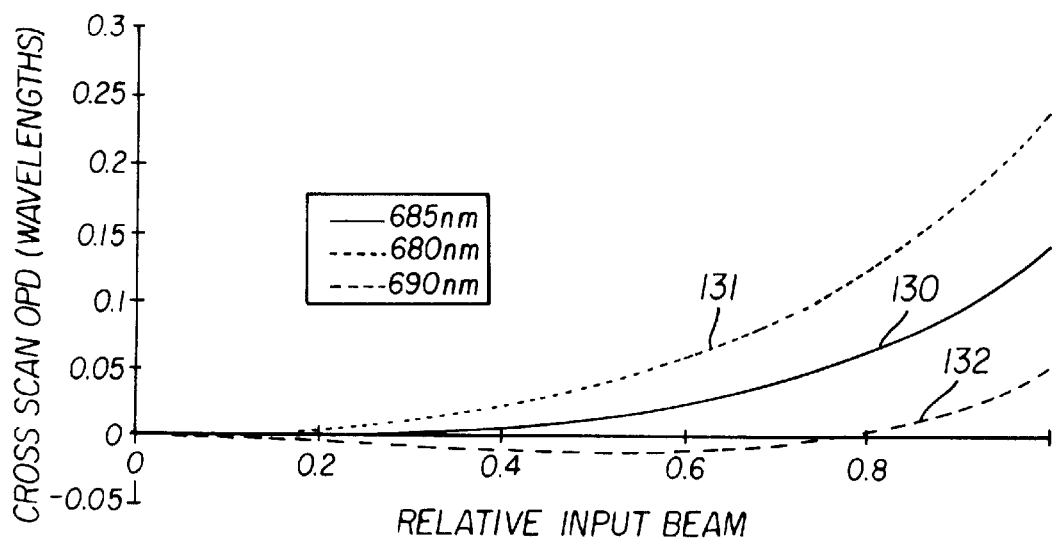
FIG. 10 are optical path aberration curves of the cross-scan section of the preferred embodiment at three nearby wavelengths at the center of scan.

All the embodiments of the present invention were specifically designed so the aberration curves for nearby wavelengths differ by either a focus shift, or image shift. This method actually leaves the conventional chromatic aberrations uncorrected, but forces their curves to differ in the desired manner. FIG. 8 shows the lateral ray aberrations of the section of the beam along the scan direction at the center of scan. Three nearby wavelengths are shown and the curves are virtually identical. FIG. 9 shows the lateral ray aberrations 120, 121, 122 of the cross-scan section of the beam for the same three nearby wavelengths. These curves differ almost entirely by a focal shift only. The solid curve is the central design wavelength with the other wavelengths on each side of this curve. Even without a re-focus for a wavelength change, the wavefront error is less than 0.25 wavelengths out to a convergence angle corresponding to 1.5 times the $1/e^2$ beam diameter, making the performance well within diffraction limited. The optical path differences 130, 131, 132 for the cross-scan section of the beam at center of scan are shown in FIG. 10.

Figure 11:
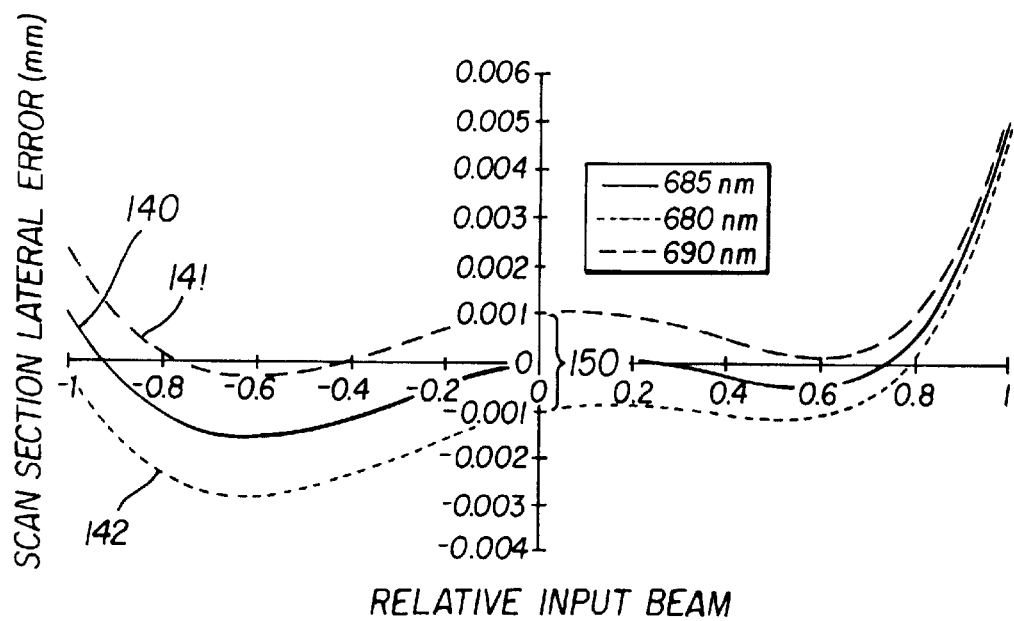
FIG. 11 are lateral aberration curves of the scan section of the referred embodiment at three nearby wavelength at one end of scan.

FIG. 11 shows the lateral ray aberrations 140, 141, 142, of the section of the beam along the scan direction at a scan angle of 12.86 degrees. These curves are substantially the same except for a transverse shift 150 along the Y axis due to conventional lateral color which is uncorrected. On the right hand side of the graph, from about an X value of 0.6 out to 1, the curves are closer together, so vertical shifts would leave these farther apart than the curves at the lower X values from −0.6 to −1, meaning that the aberration curves of the 680, 142, and 690, 141, nanometer wavelengths will not be identical to the 685 nanometer curve 140. This is inconsequential when it is considered that an X value of 1 on these curves is actually at 1.5 times the $1/e^2$ beam diameter where the intensity of the light is very low and aberrated rays this far out on the beam would not contribute significant energy to the focused spot forming the image pixel.

Figure 12:
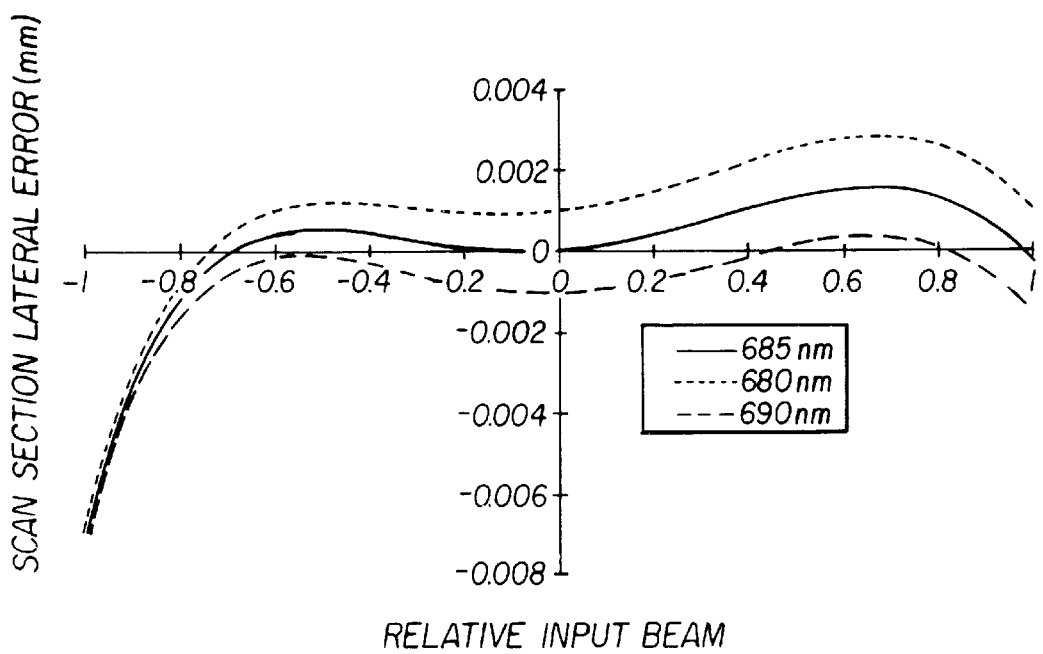
FIG. 12 are lateral aberration curves of the scan section of the referred embodiment at three nearby wavelength at the opposite end of scan.

FIG. 12 shows the lateral ray aberrations of the section of the beam along the scan direction at a scan angle of −12.86 degrees. These are very similar to those at 12.86 degrees except they are reversed in X and Y. For both 12.86 degrees and −12.86 degrees scan, the cross-scan section aberrations are substantially the same as those for center of scan, but focus shifted due to the cross-scan focal curve error.

This ray aberration analysis of the preferred embodiment is substantially the same in the other three embodiments. The data shows that the F-theta designs have the desired performance when the wavelengths of the laser light are changed to nearby values. With chromatic aberration uncorrected in the particular fashion described above, the F-theta lens is simpler in structure, namely having fewer elements and unconstrained by the requirement to correct chromatic aberrations.

Figure 13:
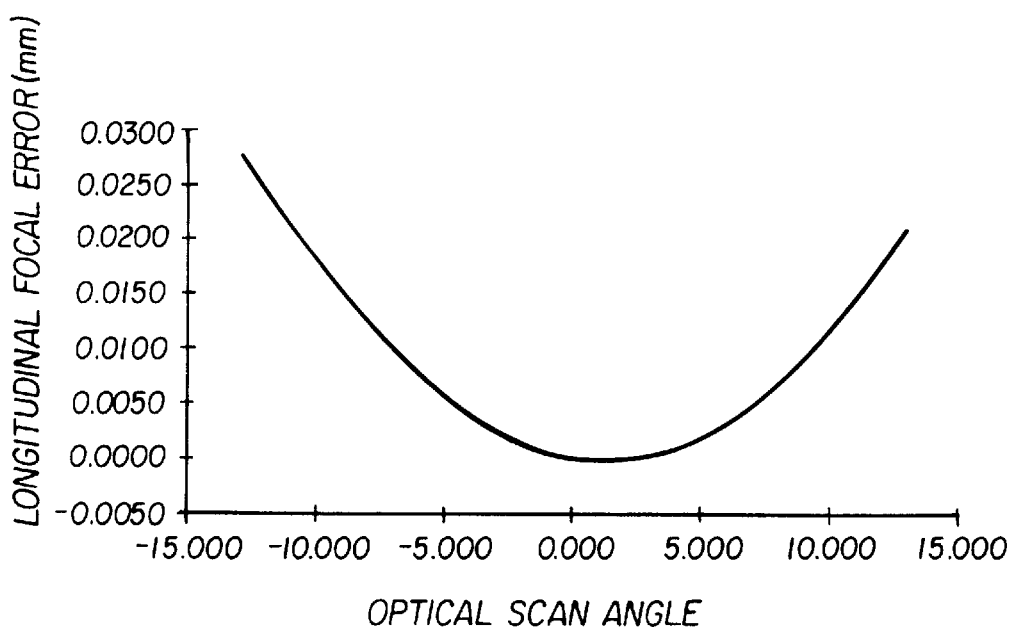
FIG. 13 is a graph of the polygon induced cross-scan image focal curve for an underfilled polygon design.

In order to understand the benefit of using an overfilled polygon design, one can find from Equation 1, under all other conditions being equal, that an underfilled polygon would need to have an internal radius of 62.1 mm. A well-made polygon with small facet pyramid errors and wobble of this size would be expensive. FIG. 13 shows the expected cross-scan pyramid focal curve for the 62.1 mm underfilled polygon, which can be compared to FIG. 4 for the overfilled polygon design. This curve has more than twice the maximum focal error and the F-theta optical contribution would leave an unacceptably large residual taking it outside the maximum permissible focal curve to avoid visible banding. Also, the larger waist focal error would cause much larger growth in the cross-scan optical spot as it scans across the image.

Figure 14:
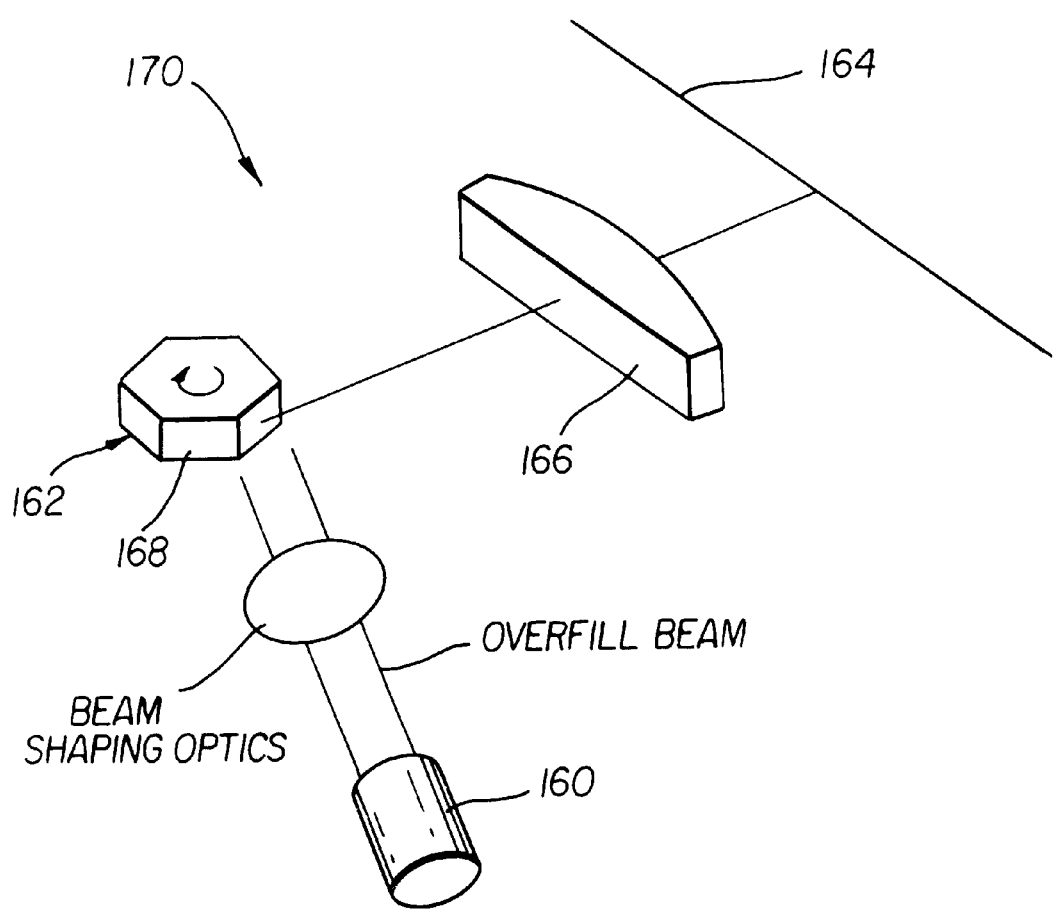
FIG. 14 shows a laser microfilm printer according to the present invention.

FIG. 14 shows a laser microfilm printer 170 according to the present invention. A laser 160 produces a laser beam which has a diameter measured at the $1/e^2$ intensity value, which is at least 1.4 times the width of polygon facet 162. The polygon facet 162 at a center of scan position is substantially optically conjugate with the image-receiving medium 164 by the F-theta lens 166 having an absolute value of optical magnification of 0.25 to 0.5 as measured from the facet 168 to the image-receiving medium 164.

The invention has been described in detail with particular reference to certain preferred embodiments thereof, but it will be understood that variations and modifications can be effected within the spirit and scope of the invention.

PARTS LIST

10. Ray
20. Ray
30. δz
40. δy
50. Lens
60. Rays
70. Polygon facet
80. Cylindrical elements
90. Spherical elements
100. Rays
110. Image-receiving medium
120. Lateral ray aberration
121. Lateral ray aberration
122. Lateral ray aberration
130. Optical path difference
131. Optical path difference
132. Optical path difference
140. Lateral ray aberration
141. Lateral ray aberration
142. Lateral ray aberration
150. Transverse shift
160. Laser
162. Polygon facet
164. Image-receiving medium
166. F-theta lens
168. Facet
170. Laser microfilm printer

What is claimed is:

1. A laser microfilm printer having a telecentric F-theta scan lens with optical resolution for image pixel sizes 1–5 microns for writing on an image-receiving medium comprising:

a polygon reflector;

a laser beam incident on said polygon reflector, wherein said laser has a diameter as measured at the $1/e^2$ intensity value, which is at least 1.4 times a width of a polygon facet in a scan section of said laser microfilm printer;

wherein said polygon facet, at center of scan position, is in a substantially optically conjugate relationship with said image-receiving medium in a cross-scan section of said laser beam; and wherein said cross-scan section of said F-theta lens has an absolute value of optical magnification of 0.25 to 0.5 as measured from the facet to the image-receiving medium.

2. The laser microfilm printer as in claim 1 wherein said telecentric F-theta scan lens comprises seven refracting elements, whose optical powers are in order from said polygon reflector, positive, negative, positive, positive, positive, wherein each is a rotationally symmetric lenses, followed by two refracting cylindrical elements whose optical powers in said cross-scan section of said laser microfilm printer are both positive.

3. The laser microfilm printer as in claim 1 wherein said F-theta scan lens has chromatic characteristics:

at a center of scan in both scan and cross-scan sections of said laser microfilm printer said F-theta lens has lateral aberration curves, for wavelengths close to a nominal wavelength said lateral aberration curves differ mainly by only a focal error over a central $1/e^2$ numerical aperture of the beam;

at scan positions off said center of scan said F-theta scan lens has scan section lateral aberration curves over a central $1/e^2$ numerical aperture for wavelengths close to said nominal wavelength lateral aberration curve which differ by substantially only a lateral shift of an image in said scan section of said laser microfilm printer; and at scan positions off said center of scan said F-theta scan lens has cross-scan section lateral aberration curves, for wavelengths close to a nominal wavelength said lateral aberration curves differ mainly by only a focal error over a central $1/e^2$ numerical aperture of the beam.

4. The laser microfilm printer as in claim 1 wherein said F-theta lens has a cross-scan focal curve sufficiently flat so that a cross-scan $1/e^2$ spot size varies by less than ±20% across an entire scan line.

5. A telecentric F-theta scan lens with optical resolution for image pixel sizes 1–5 microns comprising:
- a first positive rotationally symmetric lens;
- a second negative rotationally symmetric lens;
- a third positive rotationally symmetric lens;
- a fourth positive rotationally symmetric lens;
- a fifth positive rotationally symmetric lens;
- a sixth cylindrical element which has positive optical power in a direction perpendicular to a direction of beam rotation; and
- a seventh cylindrical element which has positive optical power in a perpendicular to said direction of beam rotation.

6. The F-theta scan lens of claim 5 wherein said F-theta scan lens has chromatic characteristics:
- at mid-point of beam rotation across an image-receiving medium, in a section of said beam parallel to said direction of beam rotation and in a section perpendicular to said direction of beam rotation said F-theta lens has lateral aberration curves, for wavelengths close to a nominal wavelength said lateral aberration curves differ mainly by only a focal error over a central $1/e^2$ numerical aperture of the beam;
- at positions of beam rotation off said mid-point of beam rotation across said image-receiving medium, said F-theta scan lens has, in a section of said beam parallel to said beam rotation, lateral aberration curves over a central $1/e^2$ numerical aperture for wavelengths close to said nominal wavelength lateral aberration curves which differ by substantially only a lateral shift of an image in a direction parallel to said beam rotation; and
- at positions of beam rotation off said mid-point of beam rotation across said image said F-theta scan lens has, in a section of said beam perpendicular to said beam rotation, lateral aberration curves over a central $1/e^2$ numerical aperture for wavelengths close to said nominal wavelength lateral aberration curves which differ by substantially only a focal error.

* * * * *